Patented Jan. 1, 1952

2,581,295

UNITED STATES PATENT OFFICE 2,581,295

TROWELABLE BITUMINOUS FLOORING COMPOSITION AND METHODS OF MAKING SAME

Cyril A. Redfarn, London, England, assignor of one-half to Durastic Limited, London, England, a British company No Drawing. Application February 3, 1949, Serial No. 74,469. In Great Britain September 11, 1947

11 Claims. (Cl. 260—28.5)

This invention relates to a trowelable bituminous flooring composition and has reference to flooring compositions obtained by mixing an aqueous emulsion of a synthetic resin e. g. polyvinyl acetate with a powdered inorganic substance of a kind that will consolidate when moistened by the water of the emulsion, e. g. an aluminous cement such as ciment fondu or Portland cement.

Experience shows that the consistency and character of such flooring compositions including polyvinyl acetate seems to be somewhat sensitive to the electro-negative charge on the particles in the aqueous emulsion, particularly in the presence of a plasticiser compatible with polyvinyl acetate because a composition containing polyvinyl acetate and tricresyl phosphate may be difficult to trowel when the polyvinyl acetate has a comparatively low electro-negative charge and if the plasticiser is omitted then the moisture absorption value is so high as to render the material unsuitable for a flooring.

The present invention has for its object to avoid the difficulties specified in the preceding paragraph and to produce a flooring composition that can be easily trowelled by skilled workers, that will be substantially oil resistant, water resistant and fire resistant, that will be resistant to dilute acids and alkalis and that will be unaffected by wide temperature changes.

Another object of the invention is to produce flooring compositions that will adhere tenaciously to steel and other surfaces, that will not shrink longitudinally or laterally or crack when laid on a metal backing, that will present a non slipping, dustless surface of great durability to wear and that will retain their resilience and/or elasticity over comparatively long periods of time.

The invention contemplates a bituminous flooring composition that can be produced by a one-stage compounding of ingredients, (one or more of which may be previously mixed or emulsified) which can be easily carried to the site of laying, that can be incorporated by unskilled or semiskilled labour assisted with comparatively crude hand operated mixing machinery and that at no time either during mixing, using or drying and maturing will give off any toxic, inflammable or malodorous vapour.

The invention further comtemplates a bituminous flooring composition comprising the mixture of an aqueous emulsion of bitumen of the kind hereinafter specified modified by polyvinyl acetate with a powdered inorganic substance of a kind that will consolidate when moistened by the water of the emulsion and such reinforcing agents, shrinkage controlling agents, fire retarding agents, fillers and pigments as are suited to the purpose in hand.

In 1948 the "Institute of Petroleum" of Great Britain officially defined bitumen as being: "A non-crystalline solid or semi-solid cementitious material derived from petroleum, which gradually softens when heated, consisting essentially of compounds composed predominantly of hydrogen and carbon. Bitumens may be black or brown in colour. They may occur naturally or may be made as end-products from the distillation of or as extracts from selected petroleum oils."

Bitumens of this type are also known as asphalts or more properly as asphaltic bitumens and certain of the natural bitumens are known as gilsonite, Rafaelite (trade name for a natural asphalt), and so on.

Whatever may be the kind of asphaltic bitumen used in the present invention it is adjusted to have a penetration value between say 60-500, a value of about 60-80 being preferred and should be of a kind that is not compatible with polyvinyl acetate, but when the finished composition is to be used for a coloured e. g. red, floor covering a hard grade will be found to give the best result as it is less liable to exude bitumen than a soft grade although the softer grade may be used if a slight stickiness on the floor surface is not objected to or is obviated by natural conditions of use and if the smears do not show e. g. when the surface is black.

Obviously the penetration value of the bitumen must be adjusted to suit the purpose in hand by blending it if necessary with a modifying agent such as petroleum residues, high boiling aromatic extracts obtained in the refining of petroleum by the Edeleanu process or by heavy mineral oil.

By a powdered inorganic substance of a kind that will consolidate when moistened by water hereinabove referred to, is meant in general aluminous cement of any kind but preferably ciment fondu although cements such as Portland cement, Titan cement, Roman cement, or Sorel cement may be employed.

By the addition of plaster of Paris to the aluminous cement used it is found that the shrinkage of the composition can be controlled particularly when anchored to a metal backing plate, under which conditions any shrinkage is confined to the thickness direction of the applied composition, the ratio of the aluminous cement to the plaster of Paris being between 15:1 to 2:1 when the aluminous cement is ciment fondu.

Plaster of Paris has been referred to as in general referring to all similar substances based on calcium sulphate when hydrated by the water of an emulsion of a thermoplastic resin the setting process resulting from the reaction

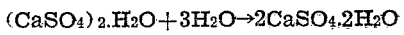
$$(CaSO_4)_2.H_2O + 3H_2O \rightarrow 2CaSO_4.2H_2O$$

producing the hemihydrate, gives the product an increase in volume.

Sometimes the setting properties of plaster of Paris are modified by added substances such as plaster of Paris mixed with alum (Keene's cement) or with borax (Parian cement) or with hydraulic lime (Scott's cement) and any of these modified forms may be used provided that the mixture is not deleterious in the circumstances.

Preferably the composition is prepared at the site of laying by adding a thoroughly incorporated mixture of the aluminous cement such as ciment fondu and the plaster of Paris with a porridge of bitumen, polyvinyl acetate, sand, asbestos, colouring pigment and water, previously mixed in an edge runner mixer to separate the agglomerates of the asbestos and coat the fibres with bitumen and polyvinyl acetate.

Alternatively the composition can be prepared at the site of laying by incorporating the powdered materials i. e. the cement, the plaster of Paris, the sand and the colouring pigment with a little water and then adding a porridge of bitumen and polyvinyl acetate with the asbestos floats.

The aqueous emulsion of bitumen and polyvinyl acetate can be prepared by putting say, one hundred parts by weight of an emulsion of polyvinyl acetate containing about fifty-five per cent solids into a warmed emulsifier (although the frictional heat developed by rapid stirring may be sufficient with a comparatively soft bitumen) and then adding slowly between ninety-three and fifty-eight parts by weight of bitumen of selected penetration value heated until pourable, some warm water finally being added to render the emulsification easier and so that the final product may be homogeneous, some of the partly prepared emulsion is run off from time to time and poured back; generally, emulsification will be complete in about forty minutes.

To complete the preparation about eight parts by weight of asbestos floats are then added and the whole is mixed in an edge runner mixer to open up the agglomerates of asbestos, thoroughly coat each fibre with bitumen and polyvinyl acetate and produce a porridge like mass that will not separate out and can be stored if a little fungicide is added.

When emulsifying the harder grades of bitumen the polyvinyl acetate emulsion is heated to 90° C. and molten bitumen at approximately the same temperature is added.

In the industrial preparation of asbestos the longer fibres are freed from the short fibres by a current of air and these short fibres passing through a series of grading sieves are commercially known as asbestos "floats" being marketed as agglomerate masses that call for careful treatment if the individual fibres are to be separated.

The nature of the composition depends on the quantity of bitumen, if the quantity of bitumen is materially reduced there will be a sticky or "jammy" effect in evidence whilst the composition is being trowelled and further if the quantity of bitumen is so reduced then the composition will be found to have a high moisture absorption value.

The above recited process is somewhat difficult to carry out with the harder grades of bitumen necessary for flooring to avoid surface smears and to offer a high resistance to water and oil absorption, and to facilitate manufacture a separately prepared aqueous emulsion of bitumen can be incorporated with an aqueous emulsion of polyvinyl acetate.

Aqueous emulsions of bitumen of different grades are available as commercial products and usually include a little bentonite or other emulsifying agent and similarly aqueous emulsions of polyvinyl acetate in some cases including some dispersing agent also are available as commercial products and may be used because the instant process does not call for any added plasticiser.

Using the above commercial products, the aqueous emulsion of bitumen and polyvinyl acetate can be prepared by thoroughly mixing about sixty parts by weight of an aqueous emulsion containing fifty-six and one half per cent of bitumen (60–80 pen) with about fifty-six parts by weight of an aqueous emulsion of polyvinyl acetate containing fifty-five per cent of polyvinyl acetate and about eight parts by weight of asbestos floats with some added water if desired in an edge runner mixer to produce a porridge like mass that will not separate out and can be kept for months without deterioration if a little fungicide e. g. a commercial phenyl mercury compound is added.

As stated above the use of an edge runner mixer not only disperses the combined emulsion product but at the same time ensures that the asbestos fibres are adequately separated and coated with bitumen and polyvinyl acetate.

From what has been said above it will be clear that the composition can be produced with different quantities of the ingredients and that some of the ingredients have to be selected to suit the particular requirements to the purpose in view.

Bearing in mind what has already been said with regard to the ratio of the cement to the plaster of Paris varying from 15:1 to 2:1, when there are presently eighty-five and one half parts by weight of ciment fondu and plaster of Paris there are between about two and ten parts by weight of asbestos floats, between about twenty and one hundred and twenty parts by weight of sand (10 mesh BS 410–1943), between about three and ten parts of colouring pigment e. g. red oxide of iron (200 mesh BS 410–1943), between about seventy and one hundred and twenty parts by weight of the aqueous emulsion of bitumen and polyvinyl acetate and about fifty parts by weight of added water.

Example 1

In the preferred method of preparation commercial emulsions of bitumen and polyvinyl acetate are used with the other ingredients specified in the following proportions:

| | |
|---|---|
| Aqueous emulsion of polyvinyl acetate (containing 55% polyvinyl acetate) | 8 lbs. 15 ozs. |
| Aqueous emulsion of bitumen (containing 56.5% bitumen 60–80 pen and 1½% bentonite) | 9 lbs. 5½ ozs. |
| Asbestos floats | 1 lb. 4½ ozs. |
| Sand (10 mesh BS 410–1943) | 14 lbs. 11½ ozs. |
| Water about | 5 lbs. 11 ozs. | and thoroughly mixed together to a stable porridge in an edge runner mixer the degree of mixing employed being such as will ensure that the emulsions are evenly dispersed throughout the mass but such mixing process should be protracted as much as possible because prolonged mixing thickens the porridge and makes the subsequent flooring mix difficult to lay.

Independently of the above, the following dry substances are intimately mixed:

| | |
|---|---|
| Cement e. g. ciment fondu | 10 lbs. 8 ozs. |
| Plaster of Paris (or Keene's cement or Parian cement or Scott's cement) | 5 lbs. 4 ozs. |

In use the porridge and the dry powder are separately taken to the site of laying and there mixed.

*Example 2*

If a coloured flooring is required, Example 1 can be modified by the addition of a suitable pigment e. g. red oxide of iron for a red flooring in which case Example 1 is modified as follows:

| | |
|---|---|
| Aqueous emulsion of polyvinyl acetate (containing 55% polyvinyl acetate) | 8 lbs. 15 ozs. |
| Aqueous emulsion of bitumen (containing 56.5% bitumen 60–80 pen and 1½% bentonite) | 9 lbs. 5½ ozs. |
| Asbestos floats | 1 lb. 4½ ozs. |
| Sand (10 mesh BS 410–1943) | 13 lbs. 7 ozs. |
| Red oxide of iron (200 mesh BS 410–1943) | 1 lb. 7½ ozs. |
| Water about | 5 lbs. 11 ozs. |

All these ingredients being mixed together to form a stable porridge in an edge runner mixer.

Independently of the above, the following dry substances are intimately mixed:

| | |
|---|---|
| Cement e. g. ciment fondu | 10 lbs. 8 ozs. |
| Plaster of Paris (or Keene's cement or Parian cement or Scott's cement) | 5 lbs. 4 ozs. |

In use the porridge and the dry powder are separately taken to the site of laying and there mixed.

*Example 3*

When the bitumen is added to the warmed emulsion of polyvinyl acetate (55% solids) in the proportions of between ninety-three and fifty-eight parts by weight of bitumen to one hundred parts by weight of emulsion of polyvinyl acetate with eight parts by weight of asbestos floats to form a porridge like mass that will not separate out, a typical mix is as follows:

| | |
|---|---|
| Cement e. g. ciment fondu | 10 lbs. 8 ozs. |
| Plaster of Paris (or Keene's cement or Parian cement or Scott's cement) | 5 lbs. 4 ozs. |
| Sand (10 mesh BS 410–1943) | 13 lbs. 7 ozs. |
| Red oxide of iron (200 mesh BS 410–1943) | 1 lb. 7½ ozs. |
| Water about | 6 lbs. 15 ozs. |
| Bituminous porridge | 18 lbs. 4½ ozs. | the method of mixing being to add the water to the dry solids, with the exception of the asbestos, and then to add the porridge like mass that includes the asbestos. If the mixing is effected rapidly then the mixture must be allowed to mature, generally the mixture is ready for laying if the mixing and maturing take about 5–15 minutes (depending on the ambient temperature) and the mixture should be laid within 40–60 minutes after mixing, the longer time referring to winter temperatures. Laying during severe frost should be avoided.

*Example 4*

When commercial emulsions of bitumen and polyvinyl acetate are used a typical mix is as follows:

| | |
|---|---|
| Aqueous emulsion of polyvinyl acetate (containing 55% polyvinyl acetate) | 8 lbs. 15 ozs. |
| Aqueous emulsion of bitumen (containing 56.5% bitumen 60–80 pen and 1½% bentonite) | 9 lbs. 5½ ozs. |
| Asbestos floats | 1 lb. 4½ ozs. | thoroughly mixed to a porridge in an edge runner mixer as already explained

| | |
|---|---|
| Cement e. g. ciment fondu | 10 lbs. 8 ozs. |
| Plaster of Paris (or Keene's cement or Parian cement or Scott's cement) | 5 lbs. 4 ozs. |
| Sand (10 mesh BS 410–1943) | 13 lbs. 7 ozs. |
| Red oxide of iron (200 mesh BS 410–1943) | 1 lb. 7½ ozs. |
| Water about | 5 lbs. 11 ozs. | thoroughly mixed together before the porridge is added and incorporated.

If desired some of the water used with the dry materials can be omitted and used to thin out the porridge during treatment in the edge runner mixer.

In all cases the actual composition is prepared on the site simple by mixing the porridge with the other ingredients but it is of importance to keep the amount of added water to a minimum since excess of water favours shrinkage. To this end in Example 4 all the dry ingredients, with the exception of the asbestos, are first mixed with the added water and then the porridge, that includes the asbestos, is incorporated.

In all the examples given above the quantity of water provided produces a composition which is only just trowellable and if desired further water may be added, the result of the addition being that the composition becomes more fluid and more readily trowellable, care must be taken however to limit the added quantity because if in the proportions referred to the quantity of added water exceeds 7 lbs. 1¼ ozs. then the moisture absorption will exceed 5% when subjected to the following test.

The moisture absorption test referred to above is made at least seven days after laying and for this purpose a test piece about one inch thick and about twelve inches square is prepared and the percentage increase in weight of the test piece is determined after total immersion in water for forty-eight hours.

Notwithstanding the presence of a small percentage of bentonite in the aqueous emulsion of bitumen that tends to increase the moisture absorption value, tests with a sample twelve inches square and one inch thick made with the mix of Example 4 only showed a four per cent increase in moisture content after immersion in water for forty-eight hours; an increase in weight of two and eight-tenths per cent when immersed in fuel oil heated to a temperature of one hundred and fifty degrees (Fahr.) for twenty-four hours with an average penetration to a depth of about one-tenth of an inch; and a thermal conductivity of two and one half B. t. u. per square foot one inch thick with a temperature difference of one degree (Fahr.).

In mixes of the kind referred to the ciment fondu is the principal bonding material, the asbestos fibres act as a reinforcing agent and non-inflammable extender, the calcium sulphate plaster controls shrinkage, the sand acts as a reinforcing agent and trowelling assistant and the water tempers the whole.

When a coloured flooring is required usually it is necessary to employ a brown bitumen having the required penetration value and add such bitumen into the aqueous emulsion of polyvinyl acetate or alternatively in making the aqueous emulsion of bitumen.

When pigment is added to the other ingredients including the brown bitumen it is necessary to reduce the quantity of sand used otherwise the floor when set is apt to be somewhat crumbly.

The quantity of sand omitted is rather more than the equivalent weight of fine pigment added presumably owing to the difference in particle size but experience shows that the precise equivalent must be determined empirically.

*Example 5*

A satisfactory green flooring can be made with the following ingredients compounded in one or other of the ways already referred to:

| | |
|---|---|
| Cement e. g. Ciment fondu | 10 lbs. 8 ozs. |
| Plaster of Paris (or Keene's cement or Parian cement or Scott's cement) | 5 lbs. 4 ozs. |
| Chromium green pigment paste (finely ground to a paste with water and containing 80% solids) | 4 lbs. 7¼ ozs. |
| Titanium dioxide | 1 lb. 6 ozs. |
| Sand | 9 lbs. 3¼ ozs. |
| Asbestos floats | 1 lb. 4½ ozs. |
| Aqueous emulsion of polyvinyl acetate (containing 55% solids) | 8 lbs. 15 ozs. |
| Aqueous emulsion of brown bitumen (containing 61% solids) | 8 lbs. 10½ ozs. |
| Added water | 5 lbs. 15¾ ozs. |

I claim:

1. The method of preparing a troweiable bituminous flooring composition, which comprises; compounding a previously prepared emulsion of eight hundred and forty-five parts by weight of asphaltic bitumen and twenty-two parts by weight of bentonite in six hundred and twenty-eight parts by weight of water with a previously prepared emulsion of seven hundred and eighty-seven parts by weight of polyvinyl acetate in six hundred and forty-three parts by weight of water, two hundred and five parts by weight of asbestos float, two thousand three hundred and fifty-five parts by weight of sand and between nine hundred and ten and one thousand one hundred and thirty-two and a half parts by weight of water only for sufficient period of time to disperse the emulsions through the other ingredients to produce a porridge like mass and then adding this porridge to a dry mixture of one thousand six hundred and eighty parts by weight of ciment fondu and eight hundred and forty parts by weight of plaster of Paris.

2. The method of preparing a trowelable bituminous flooring composition, which comprises; compounding a previously prepared emulsion of eight hundred and forty-five parts by weight of asphaltic bitumen and twenty-two parts by weight of bentonite in six hundred and twenty-eight parts by weight of water with a previously prepared emulsion of seven hundred and eighty-seven parts by weight of polyvinyl acetate in six hundred and forty-three parts by weight of water, two hundred and five parts by weight of asbestos floats, two thousand one hundred and fifty parts by weight of sand, two hundred and thirty-five parts by weight of finely divided red oxide of iron and between nine hundred and ten and one thousand one hundred and thirty-two and a half parts by weight of water only for sufficient period of time to disperse the emulsions through the other ingredients to produce a porridge like mass and then adding this porridge to a dry mixture of one thousand six hundred and eighty parts by weight of ciment fondu and eight hundred and forty parts by weight of plaster of Paris.

3. The method of preparing a trowelable bituminous flooring composition, which comprises; compounding between one thousand three hundred and fifty-five and one thousand and twenty-one parts by weight of asphaltic bitumen in an emulsion of between eight hundred and one and nine hundred and sixty-eight parts by weight of polyvinyl acetate in between six hundred and fifty-five and seven hundred and ninety-two parts by weight of water with between one hundred and fourteen and one hundred and forty-four parts by weight of asbestos floats all respectively to produce a porridge like mass in which the individual fibres of the asbestos are separated and coated with bitumen and polyvinyl acetate and then adding this porridge to a thoroughly incorporated mixture of one thousand six hundred and eighty parts by weight of ciment fondu eight hundred and forty parts by weight of plaster of Paris two thousand one hundred and fifty parts by weight of sand and two hundred and thirty-five parts by weight of finely divided red oxide of iron immediately after the incorporated mixture has been moistened with between one thousand one hundred and ten and nine hundred and seventy-three parts by weight of water.

4. The method of preparing a trowelable bituminous flooring composition, which comprises; compounding a previously prepared emulsion of eight hundred and forty-five parts by weight of asphaltic bitumen and twenty-two parts by weight of bentonite in six hundred and twenty-eight parts by weight of water, and a previously prepared emulsion of seven hundred and eighty-seven parts by weight of polyvinyl acetate in six hundred and forty-three parts by weight of water with two hundred and five parts by weight of asbestos floats to produce a porridge like mass in which the individual fibres of the asbestos are separated and coated with bitumen and polyvinyl acetate and then adding this porridge to a thoroughly incorporated mixture of one thousand six hundred and eighty parts by weight of ciment fondu eight hundred and forty parts by weight of plaster of Paris two thousand one hundred and fifty parts by weight of sand and two hundred and thirty-five parts by weight of finely divided red oxide of iron immediately after the incorporated mixture has been moistened with between nine hundred and ten and one thousand one hundred and thirty-two and a half parts by weight of water.

5. A trowelable bituminous flooring composition comprising between eighty and fifty-seven parts by weight of aluminous cement between five and one half and twenty-eight and one half parts by weight of plaster of Paris between two and ten parts by weight of asbestos floats between twenty and one hundred and twenty parts by weight of sand between nineteen and thirty-two parts by weight of polyvinyl acetate between twenty and thirty-five parts by weight of asphaltic bitumen and between eighty-one and one hundred and three parts by weight of water.

6. A trowelable bituminous flooring composition comprising between eighty and fifty-seven parts by weight of ciment fondu between five and one half and twenty-eight and one half parts by weight of plaster of Paris between two and ten parts by weight of asbestos floats between twenty and one hundred and twenty parts by weight of sand between nineteen and thirty-two parts by weight of polyvinyl acetate between twenty and thirty-five parts by weight of asphaltic bitumen and between eighty-one and one hundred and three parts by weight of water.

7. A trowelable bituminous flooring composition comprising between eighty and fifty-seven parts by weight of Portland cement between five and one half and twenty-eight and one half parts by weight of plaster of Paris between two and ten parts by weight of asbestos floats between twenty and one hundred and twenty parts by weight of sand between nineteen and thirty-two parts by weight of polyvinyl acetate between twenty and thirty-five parts by weight of asphaltic bitumen and between eighty-one and one hundred and three parts by weight of water.

8. The method of preparing a trowelable bituminous flooring composition which comprises mixing between eighty and fifty-seven parts by weight of aluminous cement and between five and one half and twenty-eight and one half parts by weight of plaster of Paris with a porridge composed of an emulsion containing between nineteen and thirty-two parts by weight of polyvinyl acetate between twenty and thirty-five parts by weight of asphaltic bitumen and between thirty-one and fifty-three parts by weight of water after the asphaltic bitumen and polyvinyl acetate have been evenly dispersed on between two and ten parts by weight of adequately separated asbestos fibres to which has been added between twenty and one hundred and twenty parts by weight of sand and adding about fifty parts by weight of water to the mixture.

9. The method of preparing a trowelable bituminous flooring composition which comprises mixing between eighty and fifty-seven parts by weight of ciment fondu and between five and one half and twenty-eight and one half parts by weight of plaster of Paris with a porridge composed of an emulsion containing between nineteen and thirty-two parts by weight of polyvinyl acetate between twenty and thirty-five parts by weight of asphaltic bitumen and between thirty-one and fifty-three parts by weight of water after the asphaltic bitumen and polyvinyl acetate have been evenly dispersed on between two and ten parts by weight of adequately separated asbestos fibres to which has been added between twenty and one hundred and twenty parts by weight of sand and adding about fifty parts by weight of water to the mixture.

10. The method of preparing a trowelable bituminous flooring composition which comprises mixing between eighty and fifty-seven parts by weight of aluminous cement between five and one half and twenty-eight and one half parts by weight of plaster of Paris between twenty and one hundred and twenty parts by weight of sand and about fifty parts by weight of water with a porridge composed of an emulsion containing between nineteen and thirty-two parts by weight of polyvinyl acetate between twenty and thirty-five parts by weight of asphaltic bitumen and between thirty-one and fifty-three parts by weight of water after the asphaltic bitumen and polyvinyl acetate have been evenly dispersed on between two and ten parts by weight of adequately separated asbestos fibres.

11. The method of preparing a trowelable bituminous flooring composition which comprises mixing between eighty and fifty-seven parts by weight of ciment fondu between five and one half and twenty-eight and one half parts by weight of plaster of Paris between twenty and one hundred and twenty parts by weight of sand and about fifty parts by weight of water with a porridge composed of an emulsion containing between nineteen and thirty-two parts by weight of polyvinyl acetate between twenty and thirty-five parts by weight of asphaltic bitumen and between thirty-one and fifty-three parts by weight of water after the asphaltic bitumen and polyvinyl acetate have been evenly dispersed on between two and ten parts by weight of adequately separated asbestos fibres.

CYRIL A. REDFARN.

REFERENCES CITED

The following references are of record in the file of this patent:

"Asphalts and Allied Substances" by Abraham, 4th Ed. page 62 (Copy in Div. 50).

Webster's Unabridged Dictionary 2nd Edition page 277.